July 16, 1940.　　　F. H. GULLIKSEN　　　2,208,420
REGISTRATION CONTROL SYSTEM
Filed June 8, 1938　　　6 Sheets-Sheet 1
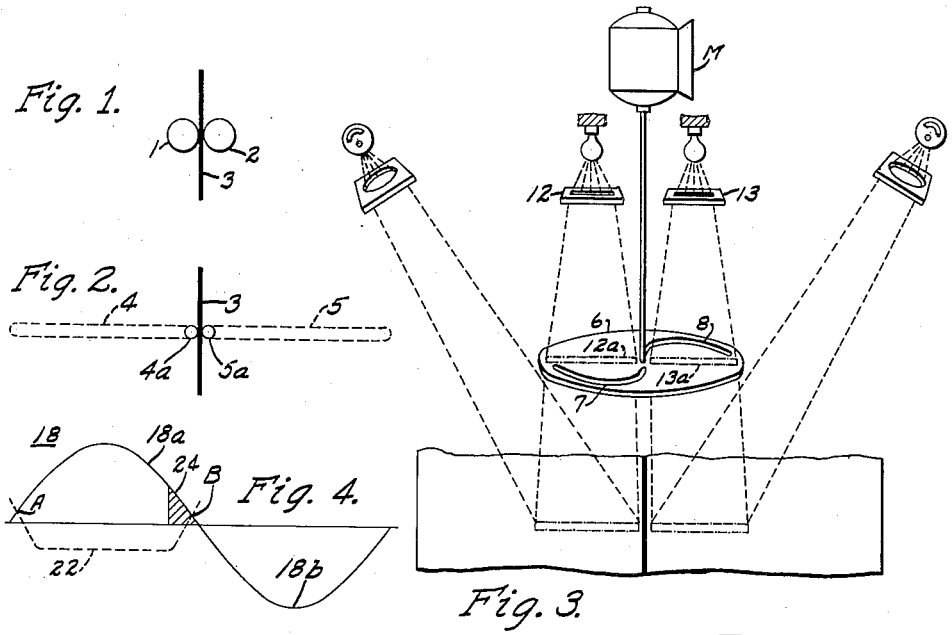
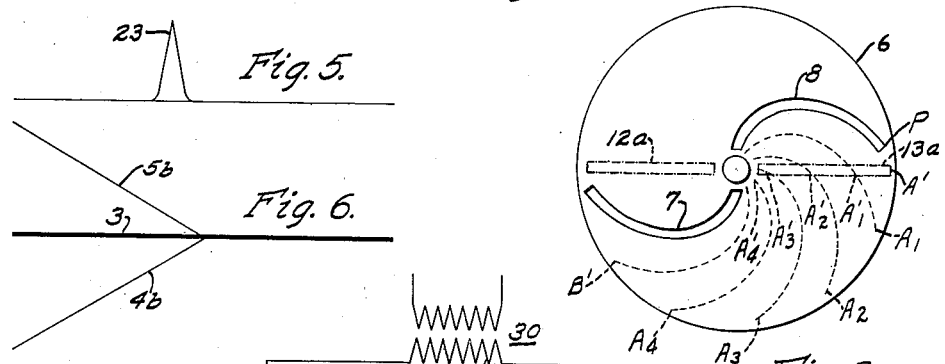
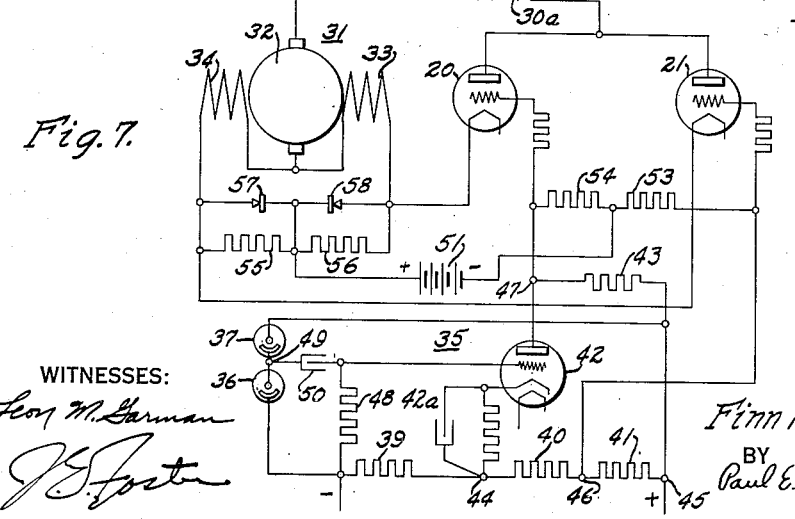
WITNESSES:
INVENTOR
Finn H. Gulliksen.
BY
Paul E. Friedemann.
ATTORNEY July 16, 1940.　　　F. H. GULLIKSEN　　　2,208,420
REGISTRATION CONTROL SYSTEM
Filed June 8, 1938　　　6 Sheets-Sheet 2

WITNESSES:
Leon M. Garman
J. E. Foster

INVENTOR
Finn H. Gulliksen
BY Paul E. Friedemann
ATTORNEY

July 16, 1940.                F. H. GULLIKSEN                  2,208,420
                          REGISTRATION CONTROL SYSTEM
                    Filed June 8, 1938         6 Sheets-Sheet 3

WITNESSES:
Leon M. Garman
J. F. Foster

INVENTOR
Finn H. Gulliksen.
BY
Paul E. Friedemann
ATTORNEY

July 16, 1940. F. H. GULLIKSEN 2,208,420
REGISTRATION CONTROL SYSTEM
Filed June 8, 1938   6 Sheets-Sheet 4
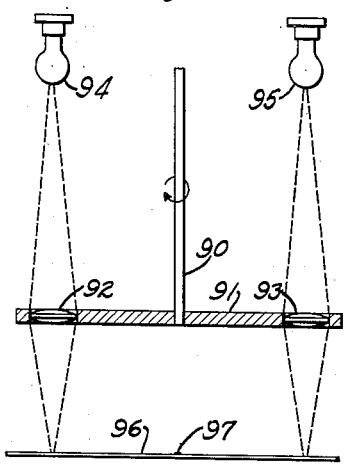
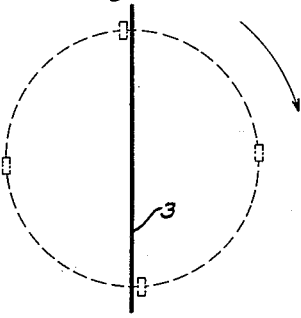
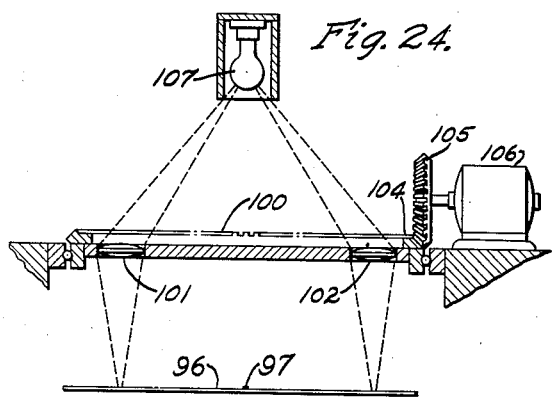
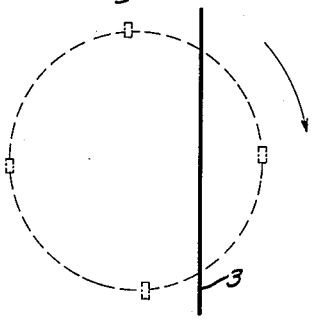
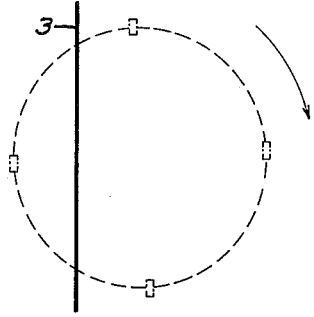
WITNESSES:
INVENTOR
Finn H. Gulliksen.
BY
Paul E. Friedemann
ATTORNEY July 16, 1940.  F. H. GULLIKSEN  2,208,420
REGISTRATION CONTROL SYSTEM
Filed June 8, 1938  6 Sheets-Sheet 6
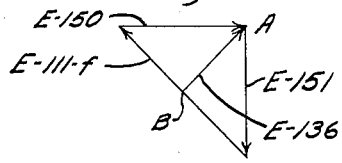
Fig. 29.
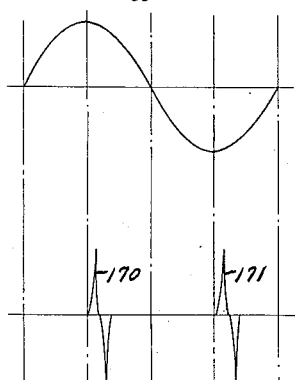
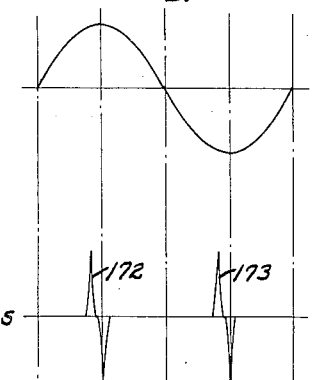
Fig. 30. A.C. Supply Voltage
Fig. 31. Impulse Volts
Fig. 32. Rectox Volts
Fig. 33. Resistor Volts
Fig. 34.
Fig. 35. Output Volts
WITNESSES:
INVENTOR
Finn H. Gulliksen.
BY
Paul E. Friedemann
ATTORNEY Patented July 16, 1940

2,208,420

UNITED STATES PATENT OFFICE 2,208,420

REGISTRATION CONTROL SYSTEM

Finn H. Gulliksen, Wilkinsburg, Pa., assignor to Westinghouse Electric & Manufacturing Company, East Pittsburgh, Pa., a corporation of Pennsylvania Application June 8, 1938, Serial No. 212,521

26 Claims. (Cl. 271—2.6)

My invention relates to an electrical system of control for maintaining a predetermined desired registration between two relatively movable objects, and particularly for maintaining a movable member in a predetermined path.

One object of my invention is to provide a control system for maintaining a desired registration between a mechanical member, such as a slitter, and a movable web-like material that is to be moved toward, and relatively to, the mechanical member.

Another object of my invention is to provide a control system for detecting any deviation of a moving web material from a predetermined path relative to a mechanical member, and for then supplying restoring energy to a suitable restoring device in accordance with the extent of deviation of the web material from its normal path, thereby to insure proper restoral without any hunting tendency.

Another object of my invention is to provide a control system with means to establish a relatively high-speed periodic detecting function that shall periodically check the location of a moving member or material with respect to a prescribed path for the member or material, and that shall also establish an immediate restoring function in proportion to the magnitude of any detected deviation at each checking operation.

Another object of my invention is to provide a registration control system having an enlarged range of control over systems heretofore employed.

Still another object of my invention is to provide a system of the type described herein which shall be extremely simple to apply in the field without excessive testing and adjustment as heretofore required.

Another object of my invention is to provide a method for controlling the position of a traveling web-like material in order to maintain proper registration between that material and a mechanical member, which consists in relatively frequently checking the position of the traveling material with reference to a normal or registering position, and in supplying restoring energy to a suitable restoring device, whenever the traveling material is found to have deviated from its proper normal path, or position, proportional to the magnitude of the deviation found at each checking or detecting instant.

In a general sense, my invention has a broad underlying principle which permits its application generally to maintain proper registration between two cooperating elements or members or materials. In order better to illustrate the invention without necessarily limiting myself to such application, however, I have illustrated the application of my invention to a system in which a desired alignment, or registration, is to be maintained between a traveling web-like material such as printed paper and a slitting machine, which is to slit or cut the paper into ribbons of predetermined width. As an aid in maintaining the desired registration between the paper and the slitter, it has been, and still is, the practice to utilize a longitudinal line imprinted upon the paper as a guide or reference line. I have illustrated such a general system with a guide line on the paper in my recent patent entitled Slitter controllers, No. 2,088,473, issued July 27, 1937, to the assignee of this application.

Another object of this invention is to widen the range of detection and control without decreasing the sensitivity of the system by employing moving light beams which scan or sweep lateral zones or areas or regions adjacent a line or path of travel, and on both sides of such line or path of travel that is to be traversed by the material that is to be controlled and registered.

In one modification of the present invention, I provide for a periodic examination of the location of the moving guide line with respect to a predetermined normal or proper path or location by causing two light beams laterally to scan or sweep two zones or regions immediately adjacent and on opposite sides of said path. Such examination by the scanning light beams is made at a relatively high frequency as, for example, at a rate corresponding to once per cycle with a standard 60-cycle current used as the timing medium. With such an arrangement the location of the guide line is checked and any deviation detected sixty times per second. To procure such periodic high speed examination of the guide line, I employ various forms of scanning devices to move the light beams laterally of the guide line, whereby the region on each side of the path for the guide line immediately adjacent its proper position may be quickly examined by one or more photo-tubes acted upon by the traveling light beams of the scanning device.

Since the guide line on the paper might deviate much or little, I desire to provide a restoral force that shall be proportioned according to the extent of deviation, so that the paper with its guide line will be restored to its normal position without any tendency to overshoot or hunt.

In order to control the system to provide a proper amount of restoral energy, I utilize a rectifier tube preferably having the characteristics of a standard grid-controlled discharge tube, which may be controlled to become conductive at any selected point of the impressed voltage wave of proper polarity. After the tube is rendered conductive, it maintains its conductivity until the impressed alternating voltage diminishes substantially to zero. By such control of the points of initial conductivity of the tube relative to the impressed voltage wave of proper polarity, a definite selected amount of energy may be transmitted by the tube to serve as corrective restoral energy. By a suitable control circuit, energized by a photo-tube upon the occurrence and detection of a deviation, the extent of the deviation is measured by the photo-tube and its control circuit to provide a correlation between the extent of deviation and the time of deviation, and the amount of restoring energy. The grid controlled tube is then controlled by the control circuit to become conductive to transmit part of the current wave proportional to the extent of the deviation of the guide line from its normal desired path.

In this manner, each time a deviation is detected during each cycle of the voltage wave of the main supply circuit, or during each half cycle, according to the system of control, a corrective restoring impulse of energy will be supplied to the appropriate restoring equipment that is a measure of the magnitude of the deviation at that instant. The progressive aggregate of the restoring energy impulses will thus, at all times, amount to just enough to restore the guide line back to its proper position, and the restoring effect both as to quantity and time, and as to speed of effectiveness will be a direct function of the extent of deviation. Thus the greater the deviation, as detected by the photo-cell, the greater will be the amount of restoring energy and the faster will be the effect of such restoring energy.

In the usual system where the web material, such as that from a roll of paper, is to be kept in proper alignment with slitting knives, the paper is fed over a roller just before it is fed to the knives, and the roller is arranged to be axially shiftable in a direction transverse to the direction of paper feed to whatever extent may be necessary to maintain the guide line on the paper in alignment with, or in registry with, a predetermined path as determined by the location of the slitting knives. The shifting equipment for the roller consists of a reversible motor acting through a worm and a worm gear to drive a lead screw that is mechanically connected to the roller to shift the roller axially, while permitting free rotation of the roller.

When the scanning devices, by means of the moving light beams and their effects upon one or more cooperating photo-cells, detect the deviation of the guide line from its proper path, the proper amount of restoral energy, according to the extent of the deviation, is supplied to the restoral motor to energize it in a direction to shift the roller just sufficiently to restore the guide line to its proper position, and thereby to maintain the desired registration between the paper and the slitter knives.

In a modified system, I employ only one photo-cell to cooperate with a rotating lens system that establishes a circular light zone to straddle the guide line symmetrically when that line is in its proper path. A deviation of the line will destroy the symmetry and thus will change the light effect upon the photo-cell, which, in turn will correspondingly control the restoring equipment. By means of this modified system, not only is the range of control also widened, but the application of the system in the field is much simplified, and obviates much of the preliminary testing and adjustments heretofore necessary in control systems employing photo-cells.

By way of illustration, I have shown the application of my invention to several simple systems for controlling a web-like material, such as a sheet of paper, that is to be fed into a slitting machine which is to slit the paper into ribbons or sheets of selected widths. The arrangements are illustrated in the accompanying drawings, in which:

Figure 1 illustrates schematically the appearance of a pair of stationary light beams, as heretofore employed, to detect the location or deviation of a guide line between them on a material that is to be moved longitudinally along a predetermined path;

Fig. 2 is a similar view showing the regions or spaces, on both sides of the guide line, that are swept or scanned by the moving light beams employed in one system of my invention;

Fig. 3 is a somewhat schematic showing of a rotatable disc that is one form of a scanning device by means of which pencils of rays from stationary light beams are moved to sweep or to scan the regions or areas adjacent to, and on opposite sides of, the guide line through paths as shown in Fig. 2;

Fig. 3A is a plan view of a slotted disc showing the progressively advancing locations of one slot;

Fig. 4 is a schematic view showing a typical relationship between a characteristic critical conductivity curve of a discharge tube, and the potential impressed across the tube;

Fig. 5 is a graphic illustration of a peak type of control voltage to be developed by the control system to initiate the conductivity of a discharge tube;

Fig. 6 is a schematic graph illustrating typical paths of movement of the spots of light on the material produced by the moving detecting beams, as controlled by the scanning disk, on each side of a moving guide line;

Fig. 7 is a diagram of a control circuit illustrating the principle of control of the discharge tubes by the photo-cells, with which only one half of a wave from each cycle is used, to supply energy to control the restoration of the material and its guide line when deviation is detected;

Fig. 23 illustrates schematically the principle of operation of still another type of scanning device involving a rotating disc with a plurality of lenses to move the light beams in a circular path in sweeping or scanning the regions adjacent and on opposte sides of the path of the guide line;

Figure 28:
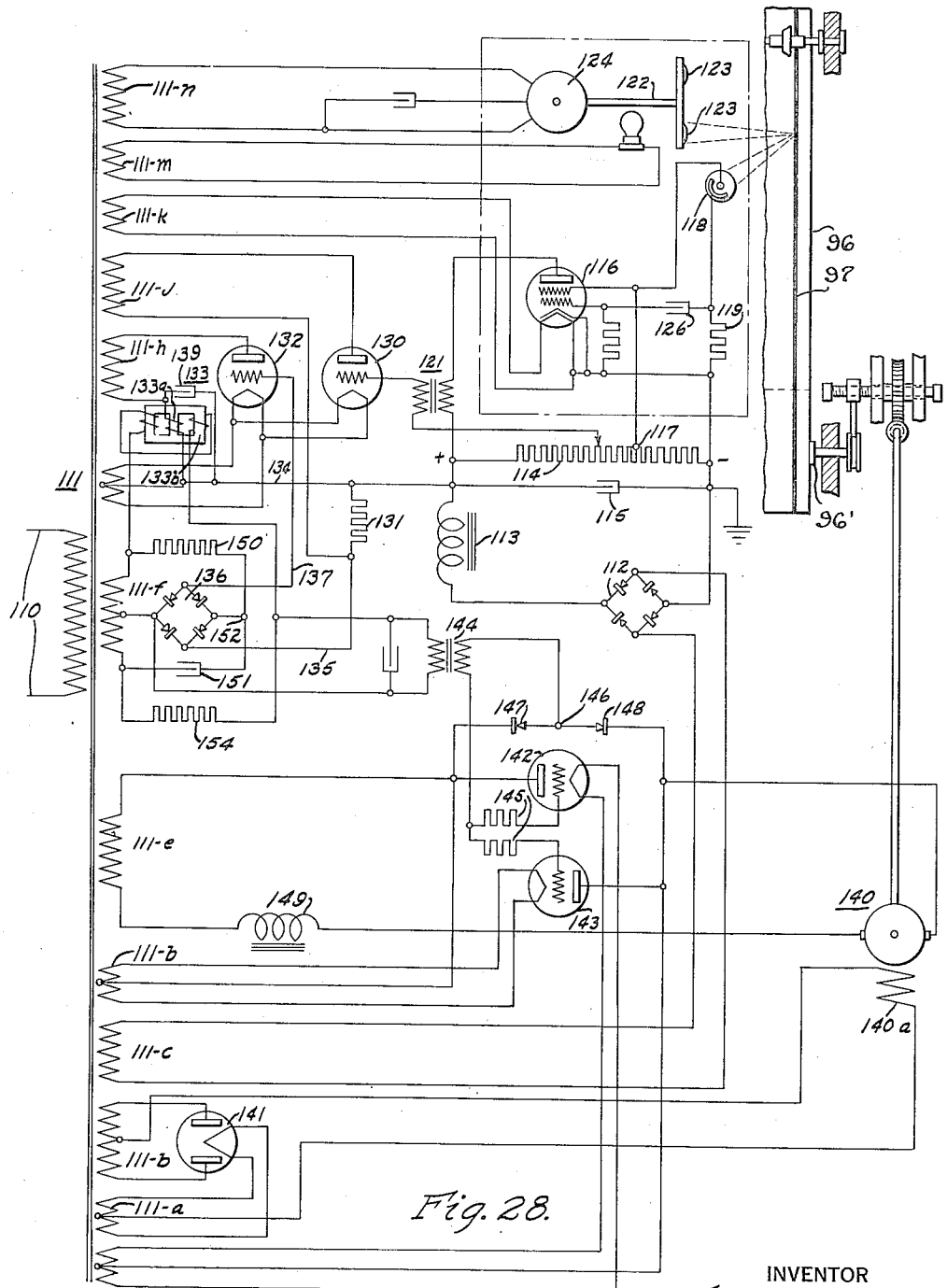

Fg. 24 illustrates a modified construction of the rotatable disc that supports the lenses to establish a sweeping action of the light beams;

Fig. 25 is a schematic plan view of a test region adjacent the guide line to illustrate the arrangement of the light beams from the rotating lens system when the guide line is in proper position;

Figs. 26 and 27 are views similar to Fig. 25 of the test region when the guide line has shifted or deviated from its proper position;

Fig. 28 is a diagram of a system in which a rotating lens system is employed to scan a test region in combination with a single photo-cell;

Fig. 29 is a vector diagram illustrating the angular relation between the applied voltage and the derived voltage of a split-phase circuit employed in the system of Fig. 28; and Figs. 30 to 35 illustrate the relations between certain voltages employed and developed in the system shown in Fig. 28.

As shown in Figure 1, the light beams, as heretofore employed, produced small stationary spots 1 and 2 disposed at each side of a guide line 3. Fig. 2 shows the paths 4 and 5 on the respective sides of the guide line 3 that are transversed by moving light beams which I employ in the systems of my present invention. In one novel arrangement, the two paths 4 and 5 extend laterally and perpendicularly from the guide line a given distance depending upon the dimension of the scanning device employed.

One type of scanning device which I employ is shown in Fig. 3. It consists of a disc 6 provided with two involute slots 7 and 8, respectively symmetrically disposed with respect to the center of the disc, and respectively extending from points adjacent the center of the disc to points adjacent the periphery of the disc. The disc 6 is suitably mounted upon a rotatable shaft of a motor M that operates in synchronism with the voltage alternations of the tubes used to control the web shifting motor. The motor M should very preferably be a synchronous motor supplied from the source used for the discharge tubes. In order to cause the moving light beams to constitute moving light spots on the material, the light beams that are controlled by the slots 7 and 8 are shaped by suitable diaphragms 12 and 13 to form relatively long narrow light areas 12a and 13a on the top of the disc 6 in the regions where they will be controlled by the slots 7 and 8. Each slot, as it moves through each narrow lighted area 12a and 13a, transmits only a small pencil of rays that is laterally moved with respect to the path of the guide line in such manner as to sweep or scan the regions adjacent the guide line path from a given distance from the guide line toward the guide line.

The action of the slots in the disc is to move the pencils of rays from both light beams simultaneously so that light spots, as 4a and 5a, formed by them will at any given instant be equidistantly spaced from the desired guide line path on opposite sides of the path. When the guide line is in the proper position in its path, both sides of the path will be equally lighted. When the guide line deviates from its path, both sides of the path will not be equally lighted, and the different effects upon the photo-cells may be used to control the restoring equipment and the restoral motor to restore the material and its guide line to proper position.

By detecting the position of the guide line at each checking instant, the control equipment measures the extent and the direction of deviation of the guide line from proper neutral position.

In order to avoid hunting or over-travel of the restoral motor in response to the control equipment when correcting for deviation of the guide line from its normal path, I have arranged this system to supply only enough energy to the restoral motor to restore the material and the guide line, according to the extent of the deviation.

In order to transmit only enough energy to correct for deviation, I prefer to utilize a grid-controlled gaseous discharge tube because such a tube may be selectively controlled to transmit a selected amount of energy. Any other device that may be controlled to supply a selective amount of energy may also be utilized but the grid controlled discharge tube or its equivalent is preferable because of the simplicity of control that is possible.

The grid-controlled discharge tube, as is well known, will conduct current when the voltage between the cathode and the anode attains and exceeds a predetermined value. The tube will continue to conduct current so long as that voltage across the main electrodes is at least equal to that critical value. When the voltage diminishes to a value below that critical voltage, the tube becomes non-conducting. When the source of voltage across the main elements of the tube is an alternating voltage, the tube will automatically become non-conducting when the voltage decreases to zero. The tube being, in effect, a rectifier, it will remain non-conducting throughout the entire negative half of the wave of each cycle. By properly controlling the voltage of the grid of the tube, the tube may be made conductive at any selected point of the positive voltage wave that is impressed across the tube, or it may be made non-conducting throughout the entire positive wave. Thus, by means of a proper potential on the grid, the tube may be controlled to conduct and to transmit any selected portion of the positive wave of an alternating current.

It becomes apparent, then, that by controlling the voltage of the grid, the tube can be made conductive at practically any selected point during the proper voltage wave. By controlling the time when the grid potential renders the tube conductive, any selected portion of the energy of the current wave may be selectively transmitted to be utilized as restoring energy. If the deviation is small, obviously only a small amount of energy will be necessary. If the deviation is larger, a larger amount of energy will be necessary if the restoral is to be effective within a relatively short time. By controlling the time at which the grid potential renders the tube conductive with respect to the duration of the current wave, the amount of energy transmitted by the tube for restoral purposes may be made to correspond to the extent of deviation.

As briefly illustrated in Fig. 3, the scanning disc moves the light spots through a zone extending some distance outward from the normal path of the guide line, and while the guide line is in its proper path the two light spots will affect their photo-cells equally. If the guide line deviates from its path, one of the light spots will strike the line before the light spot reaches its extreme innermost terminal position. When the light spot strikes the deviated line, the corresponding photo-cell will be energized less than the other photo-cell and the time of the deviation may thus be detected. At the same time, since the path of the light spot is fixed, the time when the spot strikes the line will also measure the distance of the spot from the end of its path of travel, and, correspondingly, the distance of the line from its normal path.

By properly utilizing both the magnitude of the deviation at the time when the deviation occurs and the time at which it occurs to control the potential of the grid of the discharge tube, the amount of energy to be transmitted by such a tube may thus be made a function of the extent of the deviation at the time when the deviation occurs.

The manner in which the grid potential is controlled in accordance with the magnitude of the deviation to transmit the proper amount of restoring energy may now be considered upon reference to Figs. 4 and 5.

Fig. 4 shows the curves 18a and 18b of one cycle 18, representing anode potential. If the grid control discharge tubes are connected, for example, as are the tubes 20 and 21 in Fig. 7, each tube will be available to be rendered conductive when its anode is positive. If the curve 18a of Fig. 4 be taken as the anode potential of tube 20, and if the grid of the tube is not given a negative bias to prevent the tube from becoming conductive, the tube will become conductive in response to the impressed voltage at the value of point A of Fig. 4. Once the tube has become conductive due solely to the impressed voltage at the point A, it will remain conductive until the impressed voltage reaches the point B, at which time the tube conductivity will terminate. By energizing the grid of the tube, the grid-controlled tube may be biased or blocked against conduction, notwithstanding the fact that the voltage across the main terminals of the tube may be otherwise sufficient to render the tube conducting. It becomes obvious, then, that by controlling the potential of the grid of the tube at some time between the points A and B of the impressed voltage curve, the tube may be controlled to be rendered conductive or non-conductive as desired.

Since the tube will inherently maintain its conductivity after it has been once established and until the impressed voltage diminishes to zero, it becomes apparent that to render the tube conductive the grid need be but momentarily energized by a sufficient voltage, even of short duration, such as that shown, for example, by the peaked voltage curve 23 in Fig. 5. Such momentary excitation of the grid will render the tube conductive and the tube will thereafter remain conductive to transmit the balance of the current wave, such as shown, for example, by the shaded area 24 of the positive wave shown in Fig. 4.

If, now, the peak voltage of Fig. 5, as shown in curve 23, can be located in timed relation with respect to the voltage or current wave of Fig. 4, and can also be controlled and located in accordance with the extent of deviation of the guide line on the paper or web material to be controlled, then the amount of current that will be transmitted by the tube at any one disiharge, as indicated by the shaded area 24 can be made proportional to the magnitude of the deviation of the guide line from its proper path at any time of discharge and the aggregate of energy represented by successive shaded areas 24, will be just sufficient to operate the restoring motor to restore the guide line to its proper position without moving the guide line beyond such position, and any tendency to overshoot or hunt will thereby be obviated.

Thus the use of a traveling light beam to detect the location of a guide line, and the use of that detection to control the restoral of the guide line is one of the basic principles of this invention. The use of that detection to control the amount of restoral energy according to extent of deviation is a development of that principle.

The paths 4b and 5b traversed by the light spots as 4a and 5a, as they sweep laterally from remote points to points adjacent to the guide line 3, while the guide line is moving, are illustrated in Fig. 6. Those paths of the scanning light beams are inclined to the path of the travel of the guide line since both the material carrying the guide line and the light beams are simultaneously in motion.

As shown in Fig. 7, the system comprises, briefly, a source of energy such as a transformer 30 for the restoral motor 31, which is illustrated as a series motor comprising an armature 32 and two separately and reversely effective series windings 33 and 34, respectively. Energy for the motor through the respective windings is supplied through the two discharge tubes 20 and 21. As shown in this system, the anodes of both tubes are connected to one terminal of the secondary winding 30a of transformer 30, and therefore, both tubes will be available for conduction of current to their respective windings when their anodes are positive unless the tubes are otherwise controlled by the polarity of the grid elements of the respective tubes.

In order to selectively control the discharge tubes 20 and 21, I employ a normally balanced bridge 35, which is arranged to be unbalanced according to the excitation of two differentially connected photo-cells 36 and 37 that are located on opposite sides of the guide line, to be influenced by the respectively associated light beams. One photo-cell will be energized less than the other photo-cell upon deviation of the guide line when one light beam strikes the guide line. The bridge will thereupon be unblanaced in a direction to energize the grid of one of the discharge tubes, 20 or 21, to transmit energy to the restoral motor 31 to move the traveling material in the proper direction, against the deviation, to reestablish registration.

The bridge 35 consists of two portions 40 and 41 of a potentiometer resistor, as two arms of the bridge, an amplifying tube 42 as the third arm, and a resistor 43 as the fourth arm of the bridge. The drop of potential across potentiometer arms 40 and 41 serves also as the source of voltage for the opposite terminals 44 and 45 of the bridge. The grids of the restoral discharge tubes 20 and 21 are connected to the unbalance points 47 and 46 of the bridge.

When the bridge is balanced, the amplifying tube 42 is operating at a point on its current curve below the saturation point. The tube 42 is stabilized at that point through its grid circuit which is biased through a limiting resistor 48 by a voltage derived across a portion 39 of the potentiometer resistor. The cathode of tube 42 is connected through a resistor and condenser unit 42a to the juncture 44 of the bridge. The grid of the amplifying tube 42 is coupled through a condenser 50 to a point 49 between the two photocells 36 and 37.

When the photo-cells 36 and 37 are balanced, the tube 42 maintains the bridge balanced, and when the photo-cells momentarily unbalance, the grid potential of tube 42 is momentarily modified and the current through tube 42 is either increased or decreased depending on how the photo-tubes are affected. When the current in tube 42 is momentarily altered, the grid biases on tubes 20 and 21 are also momentarily altered, and thus control the operation of tubes 20 and 21.

In order to prevent operation of the restoral tubes 20 and 21 until wanted, a normal blocking or biasing voltage 51 is imposed on the restoral tubes 20 and 21. To provide balanced application of the bias voltage, two resistors 53 and 54 are connected between the unbalance points 46 and 47 of the bridge 35 to receive one terminal of the bias voltage, and two resistors 55 and 56 are connected between the cathodes of the restoral tubes to receive the other terminal of the bias voltage. One terminal of the bias voltage is applied at the midpoint of resistors 53 and 54, and the other terminal of the bias voltage is applied at the midpoint of the resistors 55 and 56. Two rectifiers 57 and 58 are connected in opposed relation to bridge the resistors 55 and 56. When either restoral tube 20 or 21 is rendered conductive, the corresponding rectifiers 57 or 58 bypass the associated resistor to reduce the resistance in the grid circuit, to permit the unbalance voltage to overcome the bias voltage.

The operation of the system may now be considered in accordance with the principles outlined above.

So long as the guide line is in its normal position, the light that will be reflected upon the photo-tubes 36 and 37 from the respective associated traveling light beams 4a and 5a, will be equal and the photo-cells will be equivalently excited. The point 49 between the photo-cells will, therefore, be of neutral potential and will have no effect upon the grid of the amplifying tube 42 in the bridge. The bridge 35 will therefore remain balanced and the grid bias potential 51 will be effective upon the grid elements of both discharge tubes 20 and 21, to bias or block both of those tubes against becoming conductive in response to the impressed voltage from the transformer 30.

As soon as the guide line 3 deviates from its normal path, the photo-cell on the side of the deviation will be energized to a lesser degree than the other photo-cell, at the instant the beam strikes the guide line. For example, if the guide line deviates to the right, the photo-cell 36 will be energized to a greater degree than the photocell 37, and the potential of the intermediate point 49 will become more negative and will correspondingly affect the grid of the amplifying tube 42 in the bridge. The amplifying tube 42 will thereupon increase its resistance, and will unbalance the bridge 35 to establish a potential difference between the terminals 46 and 47 of the bridge 35. Point 47 will become more positive and point 46 will be relatively more negative, and the grid elements of the discharge tubes 20 and 21 will be correspondingly affected. The grid of discharge tube 20 will be rendered more positive while the grid of discharge tube 21 will be rendered more negative. Consequently, tube 20 will become conductive while tube 21 will be increasingly biased against conduction. Tube 20 will thereupon transmit energy to its associated series winding 33 and the armature 32 of restoral motor 31, and that motor will be energized to establish restoral movement of the traveling material in the proper direction to overcome the deviation.

While tube 20 is rendered conductive, the direction of potential in the circuit including the balance resistor 56 and the paralleling rectifier 58 is such as to render the rectifier 58 conductive to short circuit the associated resistor 56, and thereby to diminish the resistance in the circuit of the grid element of the discharge tube 20 to permit the voltage on the grid element to be sufficient to overcome the biasing voltage 51, and to bypass that voltage.

When the energy is supplied to the restoral motor, the motor is impulsed in the direction to restore the guide line to its normal path. If the movement of the motor has been sufficient to restore the guide line during the cycle including the positive and the negative waves when the unbalance occurred, the bridge will become immediately balanced. If the restoral has not been completely effective within that time, a second energy impulse will be transmitted through that tube during the next positive wave, and such transmission of energy impulses will continue until the guide line is restored to proper position.

If the deviation should occur in the opposite direction, then the other photo-cell 37 will be preponderantly energized to unbalance the bridge in the opposite direction and thus to excite discharge tube 21 to similarly transmit restoral energy to the restoral motor through the winding 34. In this circuit, as shown in Fig. 7, the restoring impulses are available only during the positive waves of the system voltage.

Since the disc 6 in Fig. 3 is operated by a synchronous motor supplied with energy from the same source of alternating current supplying the tubes 20 and 21 through the transformer 30, and since in practice either the phase position of the energy supplied to synchronous motor M can be shifted at will with reference to the anode potential of the tubes, or the disc can be made adjustable on the rotor shaft of the synchronous motor M, it is apparent that a given point, as P, on the disc 6 can be so positioned as to hold a position B', in Fig. 3a, when the positive voltage on the anodes of tubes 20 and 21 has the value B, in Fig. 4. Since the disc 6 operates synchronously with the anode potential, point P will always be at position B' when the anode voltage has a value B, or nearly zero. Similarly, the light spot controlled by the slot 8 in the disc 6 will be on, or practically on, the path of travel of the guide line when the anode voltage is zero, or nearly zero. In the same way, the spot controlled by the other slot will occupy a corresponding position relative to the normal desired path. As long as the line 3 does not deviate, the bridge remains balanced and the restoral motor 31 is not operated. However, when the line deviates it moves from a point in line with the axis of disc 6 toward position A'. In so doing, that portion of the beam 13a passing through slot 8 and moving from A' toward a point in the axis of disc 6, will encounter the deviated line 3 earlier and earlier the greater and greater the deviation.

For instance, if the deviation is slight, the spot of light, as moved by slot 8 from A' toward the center, will encounter the deviated line 3 at A'4, or at a time when point P is in position A4. This may be considered as such a position as to unbalance the bridge and give rise to the voltage impulse 23 of Fig. 5 at a phase position to cause the tube 20 to become conductive for the period represented by the shaded area 24.

If, for any reason, the guide line deviates a considerable extent, despite the initiated control effect, so that the moving spot, controlled by the beam 13a and slot 8, encounters the deviating line 3 at A'3, then at A'2, then at A'1 and eventually at A' then the unbalancing of the bridge 35 will occur earlier and earlier with reference to the positive anode potential of the tubes, and the result will be that the voltage impulse 23, of Fig. 5, will shift more and more to the left in Fig. 4 until it reaches the position A, corresponding to the A' position of point P, at which time the tube 20 will be rendered conductive for the entire positive half of the voltage wave represented by curve 18a in Fig. 4. The amount of energy transmitted by tube 20 is thus a direct measure of the magnitude of the deviation, and as the magnitude of deviation decreases so does the transmitted tube energy. As the magnitude of the deviation dwindles down to nothing so does the transmitted tube energy simultaneously dwindle down to nothing. The restoral energy is thus always just sufficient to effect a repositioning of the web and no more. There is thus no hunting.

Figure 8:
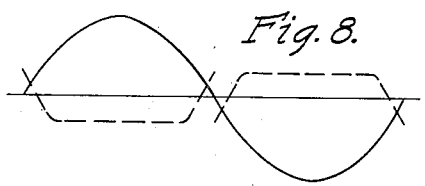
Fig. 8 is a view similar to Fig. 4, except that the critical characteristic of two tubes and the current waves of their respective polarities are illustrated.
Figure 9:
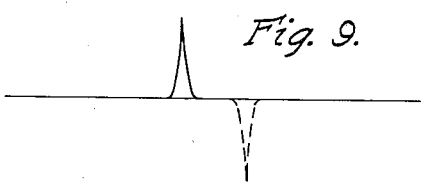
Fig. 9 is a view similar to Fig. 5, except that the critical control voltage is shown for each half of a wave and for the tubes controlled by the respective half waves.
Figure 10:
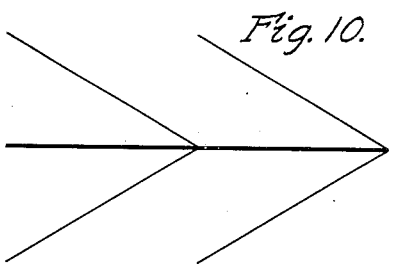
Fig. 10 is a view similar to Fig. 6, except that the light beams are controlled to scan the regions alongside the guide line during both halves of the waves of each cycle.
Figure 11:
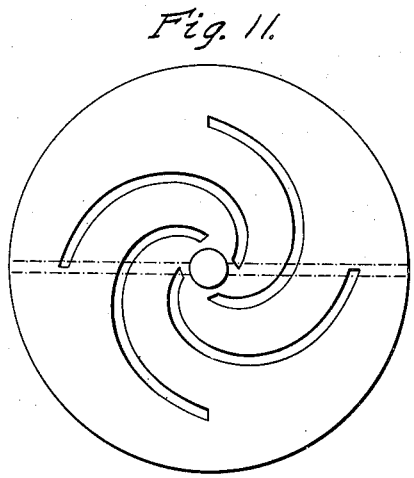
Fig. 11 is a plan view of the disk by means of which the light beams are controlled to provide the scanning action suggested in Fig. 10 during both halves of the waves of each cycle.
Figure 12:
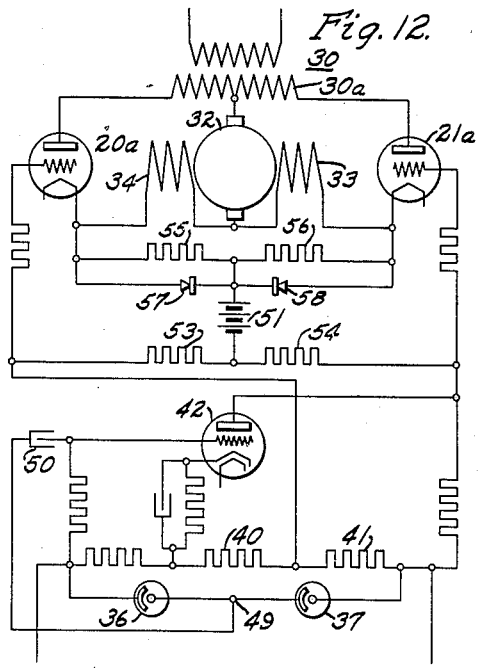
Fig. 12 is a diagram of a circuit illustrating the circuit arrangement of the control tubes and the restoring motor, where both half waves of each cycle are to be utilized and controlled in accordance with the theory indicated in Figs. 8 to 11, inclusive.

In the Figs. 8 to 12, inclusive, the features of a system are illustrated wherein both the positive halves and the negative halves of the waves of alternating current of the power circuit are utilized. In this circuit, as shown in Fig. 12, one tube 20a is connected to one terminal of the secondary winding 30a of the transformer 30, for example, and the other tube 21a is connected to the other terminal of the transformer winding 30a. The bridge system that controls the excitation of the two discharge tubes is the same as that shown and described in Fig. 7, the only difference being that in the system shown in Fig. 12, the polarities of the anodes of the discharge tubes are always opposite. In the system in Fig. 12, since both half waves are employed, the detecting operations are twice as frequent as in the system of Fig. 7, and a closer degree of control may be established.

Figure 13:
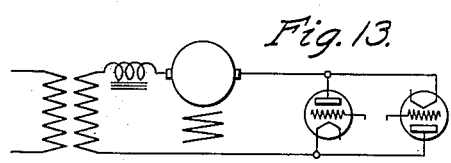
Fig. 13 is a diagrammatic circuit illustrating the manner in which a shunt wound motor is controlled by two discharge tubes arranged to be respectively effective at opposite polarities.

In Fig. 13, the tubes are shown connected to be of opposite polarities in controlling a shunt wound motor. Since the field winding will always be energized in the same direction, the direction of current through the armature will be reversed according to the operation of the discharge tubes, and the direction of rotation of the motor will be correspondingly controlled to establish restoral in the desired direction.

Figure 14:
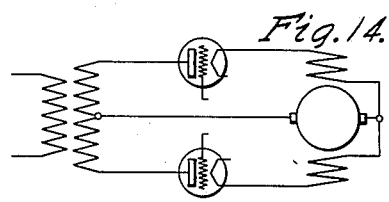
Fig. 14 is a diagram illustrating a simple circuit for a series motor with the tubes arranged to be respectively operative at opposite polarities.

In the arrangement shown in Fig. 14, the tubes are arranged for opposite polarity operation in connection with a series wound rotor. In that case, separate field windings are necessary since the current through the armature will always be in the same direction.

Figure 15:
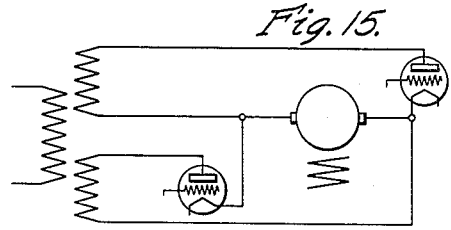
Fig. 15 is a circuit diagram for the restoring motor with the control tubes arranged to be effective for the same tube polarity.

In Fig. 15, a circuit is shown whereby the discharge tubes may be arranged for operation with both tubes of the same polarity, that is, to be available for conduction during the same half of a wave, when used with a shunt wound motor. In this case, the tubes must be selectively controlled, since both tubes will transmit current through the armature in opposite directions and the tubes must, therefore, be controlled so that only one tube will conduct current at any time.

Figure 16:
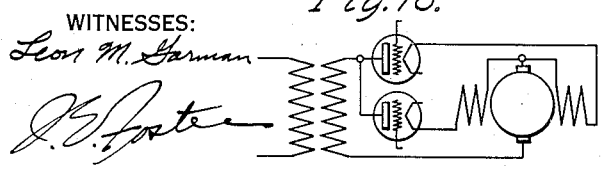
Fig. 16 is a diagram illustrating the manner in which two tubes may control a series motor with the tubes disposed to be conducive at the same polarity.

Fig. 16 shows an arrangement in which both discharge tubes are of the same polarity and, therefore, available to conduct current at the same time, except as selectively controlled to energize either of two associated series field windings of a series connected motor.

Figure 17:
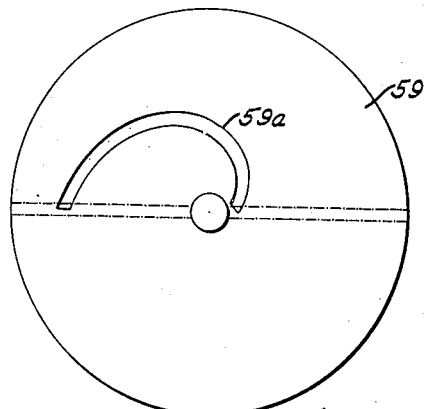
Fig. 17 is a plan view of a rotatable disc with a single slot for establishing a sweeping or scanning action of two associated light beams.
Figure 18:
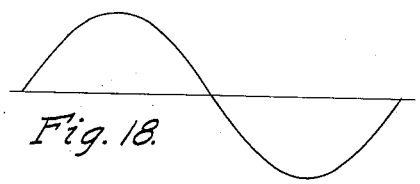
Figs. 18, 19 and 20, are, respectively, views illustrating the type of control established by the scanner of Fig. 17.
Figure 19:
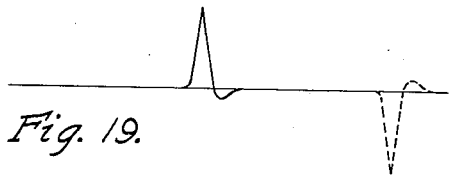
Figure 20:
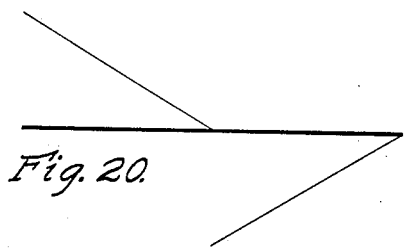

In Fig. 17, I have shown a disc 59 with a single slot 59a to alternately scan the opposite sides of the guide line, along the paths shown in Fig. 20. Both waves may be utilized, as shown in Fig. 18, and controlled by peak voltages as in Fig. 19.

Figure 21:
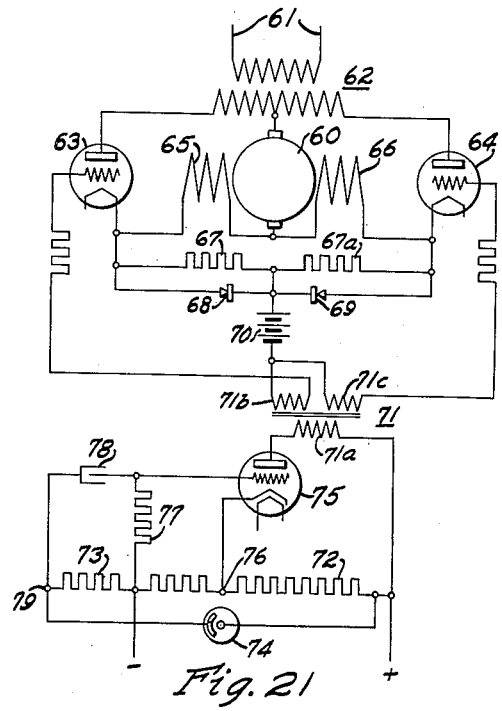
Fig. 21 is a diagram of a circuit in which a scanner of the type in Fig. 17 is employed.

The manner in which the control of the tubes is established is shown in the diagram in Fig. 21. In this diagram, I have also shown a modified arrangement, in which only one photocell is employed to detect the deviation of the guide line from its proper path. As shown in the diagram of Fig. 21, operating energy for the restoral motor 60 is derived from an alternating-current circuit 61 to which the primary winding of the transformer 62 is connected. The secondary winding of the transformer 62 is disposed with each terminal of the secondary winding connected to the respective anodes of two grid discharge tubes 63 and 64. The restoral motor 60 is provided with two reversely effective field windings 65 and 66 connected in series with the armature of the motor 60, and each winding is separately controlled by its associated discharge tubes 63 and 64, to selectively control the excitation of the respective field windings 65 and 66.

In order to prevent energization of both field windings from each discharge tube, limiting resistors 67 and 67a are connected between the outer terminals of the two field windings and between the cathodes of the two tubes, as in the previous circuits shown in Fig. 7 and in Fig. 12. The two bridging and by-passing rectifiers 68 and 69 are provided for the purposes already hereinbefore described in connection with the description of similar rectifiers shown in Fig. 7.

A source of biasing voltage 70 is also provided as in the previous diagrams.

Energization of the grid discharge tubes 63 and 64 is controlled by a peak voltage transformer 71 having a single primary 71a and two secondaries 71b and 71c. One terminal of each of the secondary windings is connected to the grid element of one of the discharge tubes 63 and 64 and a common junction point between the two secondary windings 71b and 71c is connected to the negative terminal of the biasing voltage 70 whose other, or positive, terminal is connected between the limiting resistors 67 and 67a.

The speaking transformer is energized and controlled by a photo-cell circuit, which comprises a potentiometer resistor 72 as a source of direct-current voltage, a resistor 73 and a photo-cell 74 connected across the resistor 72, and an amplifying tube 75 to be controlled by the photo-cell and disposed to discharge its plate current through the primary winding of the peaking transformer 71. The cathode of the tube 75 is connected to a point 76 on the resistor 72. The grid of the amplifying tube 75 is connected through a resistor 77 to the negative terminal of the potentiometer resistor 72, and the grid is further connected through a condenser 78 to a junction point 79 between the resistor 73 and the photo-cell 74.

When the photo-cell is illuminated, the photo-cell network may be considered to be balanced in such manner that the current through the amplifying tube is maintained at a substantially constant value below the knee of its saturating curve. When the illumination of the photo-cell is modified, the photo-cell network is correspondingly unbalanced to change the current through the amplifying tube. The change in the plate current momentarily energizes the primary winding of the peaking transformer 71 and establishes the sharp peak secondary voltage which excites the grid elements of the two grid-controlled discharge tubes 63 and 64.

Each discharge tube will be available to be conductive when its anode is positive. Each tube should, therefore, be connected so its anode will be positive and the tube able to conduct current to its associated field winding that would correct deviation on the side of the proper path which the moving beam is scanning at that time.

Thus, when the beam is scanning the right side of the proper path, the tube whose anode would be positive at that time should be connected to that field winding of the restoral motor that would establish restoral movement to correct deviation to the right of the proper path. The proper tube is thus automatically selected, however, according to the prevailing polarity of the circuit at a selected terminal point, at the time when the photo-cell is energized, since the circuit polarity and the disc location will be coordinated.

The disc should be so mounted on the motor shaft, and so disposed with the motor, that the scanning light beams will engage the guide line, if the guide line is in its proper location, at the end terminals of each voltage wave. Thus, if the beam strikes the guide line at the normal neutral position of the beam, the peak voltage will energize the discharge tubes at the instant when the voltage across the tubes is zero, and the tubes cannot transmit any restoral current. The photo-cell will thus be fully energized by the reflected light beam until the beam strikes the guide line. At that instant, the amplifying tube would be caused to vary its plate current and the peaking transformer would be energized to establish a peak voltage in each of the secondary windings. The peak voltage would be of the same polarity in both windings, but since the polarities of the two grid discharge tubes are opposite, only the proper tube would be energized to be conductive.

Since the rotation of the shutter disc, both as to position and speed, should be definitely related to the circuit voltage of the electrodes of the grid discharge tubes supplying energy to the restoral motor, the motor for the disc should be a synchronous motor and should be controlled to assure that it pulls into synchronism with proper polarity. Any well known method may be employed.

If the guide line should deviate from proper position, the scanning beam would strike the guide line off zero position and the change in the amount of reflected light on the photo-cell, at that instant, would change the grid bias on the amplifying tube and would change the plate current momentarily to establish a peak voltage in the transformer before the end of the corresponding current wave. The corresponding tube would then be energized to transmit a restoral impulse to the restoral motor. Since the scanning action is synchronously related to the system voltage, the length of the scanning path will be related to the duration of a half wave, or 180°. Consequently, when the scanning beam encounters the guide line out of its proper normal path, that encounter will take place before the beam reaches the end of its scanning movement which will correspond to a similar interval before the end of the current wave. The deviation as thus physically measured by the scanning beam is directly time related to the electrical space or distance ahead of the zero value at the end of the current wave. The peak voltage is thus generated when the deviation is detected and serves immediately to energize the restoral tube at the same instant. The amount of energy transmitted in the impulse by the tube will, therefore, be a function of the deviation. When the guide line is in proper position the peak voltages of Fig. 19 are displaced 180 degrees. When the line is out of position, only one peak voltage will be generated.

Figure 22:
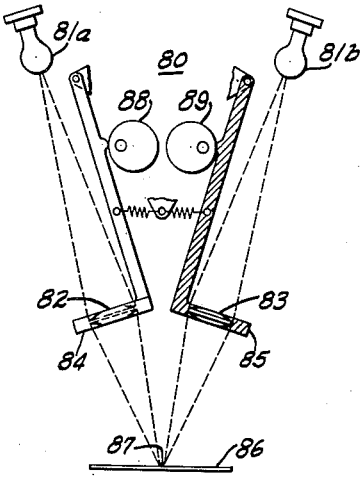
Fig. 22 is a schematic view of a third type of scanning device in which the light beams are moved laterally to sweep the regions adjacent the guide line by oscillating lenses.

In Fig. 22, I have shown, in simple schematic form, a scanning equipment 80, in which two lamps 81a and 81b serve as sources of light from which the light is respectively collected by two associated lenses 82 and 83, respectively. The lenses are mounted upon suitable oscillating members 84 and 85, by means of which the lenses are oscillated to cause the light beams, as projected by the lenses on the travelling material 86, to move laterally with respect to the path of a longitudinal guide line 87 on the travelling material 86.

The lenses 82 and 83 may be arranged to be oscillated about their pivotal supports by cam mechanisms 88 and 89 operated by any suitable source of energy, at any desired synchronous speed, all of which may be established by proper arrangement or design of the oscillating mechanism.

The lens system may be operated to establish the same type of travel of the spot of illumination as shown in Fig. 6. The operation will thus be to scan both sides of the guide line simultaneously.

In Fig. 23, I have illustrated schematically a simple construction, and a principle of operation, involving a rotating scanning device consisting of a rotatable shaft 90 carrying a disc-like support 91 upon which are mounted two lenses 92 and 93, or more than two lenses, in pairs, symmetrically disposed. As shown in this figure, light is received by the lenses from two lamps 94 and 95 and projected upon a travelling web or paper 96 in a circular path normally divided by a guide line 97 on the paper. One or more photo-tubes may be employed with this scanning device.

In Fig. 24, I have illustrated a modified form of scanner in which a rotating support 100 for lenses 101 and 102 may be rotated through a suitable driving gear 104 by a pinion 105 on the shaft of a high speed synchronous motor 106. A lamp 107 above the rotating lenses provides the light for the various lenses.

Figs. 25, 26 and 27 are schematic plan views of a testing light region as outlined by the system of rotating lenses. Fig. 25 shows the circular path defined by the light beams from the lenses, with the guide line shown in its proper normal position, bisecting the circular zone formed by the light beams from the rotating lens system.

Fig. 26 illustrates a situation when the guide line 3 has deviated towards the right from its normal position in the circular test zone. Fig. 27 illustrates a situation when the material has shifted towards the left and the guide line 3 has moved from its normal position in the middle of the test zone.

With such a detecting system, where the light beams form a circle, the scanning device can be easily and simply installed by locating the circle so it will be disposed symmetrically across the proper path for the guide line. Since the path of each light beam is a circle, and the motor is synchronously driven, any point on the light circle will bear a definite relation to a point on the voltage wave of the system. Therefore, when the guide deviates from its path and is engaged by a light beam at some particular point on the circular path, the deviation may be translated to a corresponding time position on the voltage wave, and that position used as a measurement of deviation to control the conduction of a correspondingly sized impulse of current to the restoral motor.

The direction of deviation will be detected according to whether the light beam encounters the guide line in front of, or behind, its proper registration path, and the restoral motor will be correspondingly controlled to establish restoral in the proper direction.

Thus both the extent and the direction of deviation will be detected and related to the system voltage as a timing and measuring medium to control the measurement of restoral energy to be transmitted to the restoral motor.

A system in which I employ a single photo-tube in connection with a rotating system of lenses is illustrated in the diagram of Fig. 28. In that system, I achieve several advantageous functions. The system detects, first, a deviation of the guide line from its normal position; second, it measures the extent of the deviation of the guide line; third, the direction of the deviation from the guide line; fourth, it controls the supply of restoral energy to the motor in accordance with the extent of deviation, and particularly in accordance with the extent of deviation within a unit of a predetermined time interval. A particularly important advantage is that the range of control is enlarged. Another advantage, in the field, is that the necessity for many adjustments is obviated. When installing the system, the control lens unit is set up so the lens light circle will be properly bisected by the guide line of the paper when that guide line is in its proper position.

The system in Fig. 28 will be first described and then its operation will be considered.

As shown in Fig. 28, operating energy for the control system is derived from an alternating-current source 110, to which is connected the primary winding of a control transformer 111, having a number of secondary windings 111—a to 111—g, respectively, which are provided for purposes to be described. The secondary 111—c is connected to energize a rectifier bridge 112 from which a direct-current voltage is available for the energization of the photo-tube detecting circuit. The bridge 112 is connected through a reactor 113 to a potentiometer resistor 114, and a condenser 115 is provided across resistor 114, to absorb the ripple direct currents. An amplifying tube 116 is connected across the terminals of the potentiometer resistor 114, the cathode of the tube being connected to the negative terminal, and the anode of the tube being connected to the positive terminal. The amplifying tube 116 is provided with a biasing grid that is connected to a negative point 117 on the potentiometer resistor 114. A photo-tube 118 is connected in series with a resistor 119 between the negative terminal of the potentiometer resistor 114 and the point 117 on that resistor. A control grid of the amplifying tube 116 is connected through a condenser 126 to the juncture between the resistor 119 and the photo-tube 118. The plate circuit of the amplifying tube 116 includes the primary winding of a peaking transformer 121. The constants of the elements connected to the tube 116 are such as to maintain a constant plate current below the saturation point of its current curve. Any change in the plate current establishes a momentary rapid voltage change in the peaking transformer.

The web 96 is moved longitudinally by suitable rollers, as roller 96' operated in any suitable manner. The photo-tube 118 is located adjacent the guide line, or reference index means 97, on the travelling material 96 that is to be kept in line, so that the tube may respond to the degree of lighting in the lighted testing zone of the type illustrated in Fig. 25. The rotating lens system is illustrated in simple schematic form in Fig. 28 as consisting of a shaft 122 carrying the lenses 123 and driven by a synchronous motor 124 that is energized from the secondary winding 111—n.

While the illumination of the photo-tube remains constant, the amplifying tube 116 will not be affected, but will operate on a fixed point of its current curve. The plate current through the amplifying tube 116 thus remains constant, and the peaking transformer 121 is not energized. Upon changes in the plate current of tube 116, the peaking transformer 121 becomes momentarily energized to generate an impulse voltage. That impulse voltage of the peaking transformer excites the grid of the discharge tube 130 and renders that tube conductive to transmit current if the current is of the proper polarity at that instant. The grid discharge tube 130 is connected in series with the secondary winding 111—j and a resistor 131. The grid circuit of the discharge tube 130 includes, in addition to the secondary winding of the peaking transformer 121, a portion of the potentiometer resistor 114, which portion serves as a source of biasing potential, normally to bias the grid of that tube 130, to block conduction in the tube 130.

When the voltage developed in the peaking transformer is effective to overcome the biasing voltage in the grid circuit, and the impressed voltage from the secondary winding 111—j is of such polarity that the anode of tube 130 is positive, the tube 130 will be rendered conductive. The plate current will traverse the resistor 131 and will establish a drop of potential across that resistor which will serve for the time being as a biasing voltage to prevent conduction, under certain conditions, in a second grid discharge tube 132.

The plate circuit of the second grid discharge tube 132 is connected in series circuit relation with the secondary winding 111—h and a winding 133—a of a reactor 133. The grid control circuit of the second discharge tube 132, insofar as it is affected by the biasing resistor 131, may be traced from the cathode of grid discharge tube 132, a conductor 134, to the top of the resistor 131, through the resistor 131, through a conductor 135 to rectifier bridge 136 at secondary winding 111—j, through the bridge and a conductor 137 to the grid of the discharge tube 132. The voltage drop across the resistor 131 counteracts the voltage from the rectifier bridge 136 and thus controls the grid voltage either to block or to unblock the discharge tube 132 to prevent it from operating or to permit it to operate, according to whether the tube 130 is already energized or is not yet energized.

It might be well at this point to pass briefly to the part of the system which includes the restoral motor 140. That motor is provided with a shunt field winding 140—a which is constantly energized from the secondary winding 111—b through a double wave rectifier 141. Field rheostats are not shown. The armature of the restoral motor 140 is energized from the secondary winding 111—e through either of two discharge tubes 142 and 143. The discharge tubes 142 and 143 are reversely connected, in parallel with each other, so that each one will be able to transmit current waves of only one polarity, depending, of course, upon whether it is permitted to be conductive by the control circuit at that time to transmit such current wave.

The grid circuits for the two restoral discharge tubes 142 and 143 are controlled by a peaking transformer 144 whose secondary winding has one terminal connected to a balanced double resistor 145 connected between the two grids of the restoral tubes 142 and 143, and the other terminal of the peaking transformer secondary is connected to a mid-point 146 between two reversely connected, and opposing, rectifier units 147 and 148. In order to limit the current in the armature circuit of this restoral motor, a reactive device 149 is provided in that circuit.

The voltage of the peaking transformer 144 renders the restoral discharge tubes 142 and 143 selectively effective to energize the restoral motor, as the motor circuit polarity reverses. As such polarity of the motor circuit reverses, the restoral motor tubes 142 and 143 will tend to be available alternately for current conduction, according to such circuit polarity. The voltage of the transformer 144, however, will selectively render the tube 142 or 143 conductive to effect restoral action by the motor 140, according to the direction of deviation detected by the photocell and the subsequent energization of tube 130 or 132. The motor will thus be selectively energized to operate more in one direction than in the opposite direction, to effect restoral operation when the web material deviates from its path. Such control of the tubes 142 and 143 is established by means of a phase-shifting circuit that is controlled by the discharge tube 132, which will now be described.

In order better to understand the manner in which the phase-shifting circuit operates, the circuits connected to the secondary winding 111—f will be first considered.

The secondary winding 111—f has one phase-shifting circuit connected to it which includes a resistor 150 and a condenser 151. The voltage relationship in that circuit is schematically illustrated in the vector diagram in Fig. 29. As shown in that diagram, the voltage drop across the resistor 150 is represented by the vector E—150. The voltage drop across the condenser 151 is represented by the vector E—151. The voltage across the secondary winding 111—f, which is the applied voltage across the split-phase circuit, is represented by the vector E—111—f. The rectifier bridge 136, as it is connected between the midpoint of the secondary winding 111—f and the juncture point 152, connecting the resistor 150 and the condenser 151, is subjected to a voltage E—136 at right angles to the applied voltage E—111—f of the secondary winding 111—d. The alternating voltage impressed upon the rectifier bridge 136, is represented by the vector E—136 between points A and B of the vector diagram in Fig. 29, and is thus 90° displaced from the voltage of the transformer secondary 111—f, and is similarly displaced from the voltage across secondary 111—h. Thus, the rectified voltage derived from the rectifier 136 would normally induce conduction in grid discharge tube 132 at the 90° point of the voltage timing wave if the grid circuit of tube 132 were not otherwise biased to prevent conduction of the tube 132, by the drop across resistor 131.

As previously described, the grid discharge tube 130 has the resistor 131 connected in series with it. Consequently, when tube 130 is energized, resistor 131 will have a potential drop across it that will be in a direction to oppose and overbalance the rectifier voltage connected to the grid of the tube 132. If tube 130 is not energized and resistor 131 is not traversed by the plate current of the tube 130, the resistance value of the resistor 131 is sufficiently small to permit the rectifier voltage from rectifier 136 to energize and initiate the operation of discharge tube 132. Thus, by means of the resistor 132, an electrical interlock is established between the two grid discharge tubes 130 and 132 in such manner that tube 132 cannot be rendered conductive whenever tube 130 has already been rendered conductive.

Because of the characteristics of tubes 130 and 132, however, there is more to be considered in the effectiveness of the rectifier 136 and of the resistor 131 in controlling the tubes 142 and 143. As previously explained, the characteristics of tubes 130 and 132 are such that, once the tube has been rendered conductive, it will remain conductive, even if a biasing voltage should be applied immediately thereafter and before the end of the current wave, and even though the biasing voltage would be capable of blocking conduction when conduction had not yet been established. The resistor 131 (through tube 130) and the rectifier 136 are thus provided and are effective to control the tube 132 in accordance with the location of the guide line on one side or on the other side of its normal neutral position. Such selective detection and operation are achieved according to the chronological effectiveness of the voltage established by the rectifier 136 and the voltage established across the resistor 131.

Thus, if tube 130 is energized by peaking transformer 121, with a consequent immediate voltage drop across resistor 131, before the rectifier 136 is effective to energize the grid of tube 132 for conduction, the tube 132 will be blocked against operation by the voltage drop across the resistor 131, and the voltage across the rectifier 136 will be ineffective to operate the tube 132.

If, however, the rectifier is effective to energize tube 132 before peaking transformer 121 energizes tube 130, tube 132 will be energized and rendered conductive before the voltage drop across resistor 131 may block the tube 132. Once the tube 130 is rendered conductive, it is immaterial that resistor 131 becomes energized to apply a biasing voltage that would otherwise be effective to block the tube 130 against operation.

The chronological timing between the voltage of rectifier 136 and the voltage across resistor 131, is thus controlled by the time when the peaking transformer 121 is energized by amplifying tube 116. That, in turn, goes back to the time when the photo-tube 118 is affected to energize the amplifying tube 116; and the critical action of the photo-tube, in turn, depends upon the time when the rotating beams from the lenses strike the guide line on the material to be controlled, as shown in Figs. 25, 26 and 27.

Thus the guide line is the time changing line, to control the sequence between resistor 131 and rectifier 136. The photo-tube illumination will be modified every time the guide line is engaged by a light beam from a rotating lens. When the equipment is first installed, the motor-driven lens system is initially set up and located physically with respect to the desired path of the guide line, so that the guide line in its proper normal neutral path will be engaged by a light beam, and an impulse peaking voltage established, at the instant corresponding to the 90° point on the positive or negative wave of the main circuit voltage, as shown in Fig. 30. The beams from one pair of opposite lenses will engage the guide line at the instant corresponding to the time of the mid-point of positive waves and the beams from the other pair of lenses will engage the line at the mid-point of the negative waves, when the guide line is in neutral position. For simplicity, those beams will be identified as positive beams and as negative beams.

When a positive beam strikes the guide line in proper position, a peaking voltage impulse 170 is generated at the instant of the 90 degree point of the positive voltage wave in Fig. 31. Similarly, when a negative beam strikes the guide line in proper position, a peaking impulse 171 will be generated at the instant of the 90 degree point of the negative voltage wave, as in Fig. 31.

When a positive or negative beam strikes the guide line off normal position, either ahead of or behind the normal instant, the peaking voltage will be generated correspondingly, ahead of or behind the 90 degree instant.

If a positive or a negative beam strikes the guide line ahead of normal position, the peak impulse 172 or 173 will be generated ahead of the 90 degree instant of the positive or of the negative wave, as in Fig. 31b. Thus, the position of the peak impulse relative to the 90 degree instant of each voltage wave is determined by the time when a beam strikes the guide line.

The rectified voltage 174 derived from the rectifier bridge 136 is always at the 90 degree point of both waves, as shown in Fig. 32a and Fig. 32b. The position of the peak voltage impulse relative to the rectifier voltage is therefore also determined by the time when a beam strikes the guide line relative to its normal neutral position.

It will aid in the understanding of this system to consider the neutral position of the guide line as the extreme left-hand edge of the right-hand zone along the guide line path.

Thus, when a positive beam strikes the guide line anywhere on the left-hand side of the neutral position, the resulting critical response of the photo-cell will cause the peaking voltage impulse to energize and start tube 130 in time to energize resistor 131 and to prevent tube 132 from operating during the positive wave, when the tubes 130 and 132 will normally be available for operation. In that case, resistor 131 is energized ahead of the 90 degree instant, as shown by resistor voltage drop 175 in Fig. 33b.

When a positive beam strikes the guide line in neutral position, or to the right of neutral position, tube 130 will not be started in time to energize resistor 131 and to prevent tube 132 from operating in response to the voltage of rectifier 136. Tube 132 will therefore, start operating in response to applied voltage and grid excitation by rectifier 136. That relationship is illustrated by the delayed resistor drop 176 in Fig. 33A, where the voltage across the resistor 131 is behind the 90 degree point, at which the rectifier has already become effective.

Thus, when the guide line is to the left of neutral position, tube 130 will start operating first; but when the guide line is on neutral position or to the right of neutral position, tube 132 will start first, when a positive beam strikes the guide line.

When a negative beam strikes the guide line, neither tube 130 nor 132 will operate since their anodes are negative at that time. When tube 132 operates, it energizes and controls the impedance of the impedance device 133 whose primary winding is connected in the plate circuit of tube 132. That impedance device controls a second split-phase circuit to control the energization of the restoral motor 140.

We may now consider the second split-phase circuit connected to the secondary winding 111—f. That circuit includes a resistor 154 as one branch, and the secondary or alternating current winding 133—b of the impedance device 133, as the other branch. The primary or direct current winding 133—a of the impedance device 133 is connected in the plate circuit of the discharge tube 132 and is bridged by a condenser 139 to maintain the winding energized to sustain the saturation of the impedance 133 for an extended interval.

The impulse transformer 144, connected to this split-phase circuit, is energized by the voltage between the mid-point of the transformer secondary 111—f and the juncture point between the resistor 154 and the reactor secondary 133—b. As the reactance of the secondary winding 133—b is varied, the phase position of the voltage supplied to the impulse transformer 144 is shifted.

When tube 132 conducts current and energizes the primary winding of impedance 133, the magnetic circuit of the impedance becomes saturated and reduces the impedance of the secondary winding 133—b to a minimum value. When tube 132 does not conduct current, the impedance of the secondary winding 133—b is at its maximum value. The impedance of secondary winding 133—b is thus varied from a maximum value when tube 132 is not conducting, to a minimum value when tube 132 is conducting.

As the impedance of the secondary winding 133—b is varied, the phase relation of the phase-displaced voltage to the primary of the impulse transformer 144 is varied, and the restoral tubes correspondingly controlled to energize the restoral motor. The voltage to the impulse transformer 114 may thus be shifted through a substantial angle in excess of 90 degrees and to substantially 180 degrees. Its action on the restoral tubes may now be considered.

As the polarity of the terminals of secondary transformer winding 111—e changes, the restoral tubes 142 and 143 alternately are of proper polarity to be available for conducting the current waves of the corresponding polarities to the motor armature. If, while either tube is available for conductivity, its grid is given a positive potential, relative to its cathode, by a positive wave of the impulse transformer 114, that tube will be rendered conductive. The other tube will be non-conductive at that time, however, since its anode is negative. Thus, one tube will transmit a full wave impulse of one polarity to energize the motor armature to start restoral movement. If complete restoral is not effected within that cycle, the same tube will be conductive to transmit the next succeeding wave of the same polarity. Such action will continue until restoral is completed.

The operation is thus such that neither tube transmits current while the guide line is in proper position. When the guide line is off normal position, either one tube 142 or the other tube 143 will pass its maximum current.

During the negative wave from the impulse transformer 114, both grids will be negative and neither restoral tube will transmit current to the restoral motor.

The two rectifiers 147 and 148 to which the impulse transformer 114 is connected, serve to provide a low resistance connection to either cathode at proper polarity.

Thus, while the guide line is off normal position, the restoral tubes will be selectively energized to transmit current waves of proper polarity to operate the motor to nullify the deviation. The selective action is established by the phase-shifting of the voltage from the impulse transformer 114 upon the grids of the restoral tubes 142 and 143, in response to variation of the impedance value of secondary winding 133—b of impedance 133.

As shown in Fig. 34a, the current through control tube 132 starts with the voltage of rectifier 136, when not blocked by resistor 131, and energizes coil 133—a to saturate the reactor and keep it saturated for an interval of 360 degrees. During the cycle when tube 130 is energized, but not tube 132, the reactor flux diminishes, since winding 133—a is no longer energized, and increases the impedance of the winding 133—b in the split-phase circuit. Such flux variation controls the impedance value of the secondary winding of the impedance device 133, and in turn controls the phase position of the secondary voltage of the impulse transformer 144, as shown in Fig. 35.

By means of such selective action between tubes 130 and 132 according to the time when the light beams strike the guide line, and by means of the phase-control of the restoral tubes, the restoral motor is selectively controlled to correct deviation as detected by a single photo-cell.

While I refer to such correction as being proportional to the deviation, it is not an exact proportionality but rather the correction is a function of the deviation.

The use of a single photo-cell simplifies the system by depending upon the responses of single cell and thereby obviates the necessity for balancing cooperating tubes. The application of the system in the field is thereby simplified.

A further advantage of the system with the four lenses is that it obviates any necessity for controlling the lens motor to assure pulling into step with a definite polarity, since each lens is related to a corresponding point on the respective waves, and the control tubes 130 and 132 will operate only when the circuit polarity is proper.

My invention is not limited to any of the particular devices or structures, or details of construction, as illustrated, nor to any specific arrangement that is shown since they may be modified and rearranged without departing from the spirit and scope of my invention as set forth in the appended claims.

I claim as my invention:

1. In a control system, an operating member; means for moving material forwardly towards the operating member; means for shifting the moving material laterally, if necessary, to counteract any lateral deviation of the material from a normal neutral path, in order to maintain the moving material in desired proper operative alignment with the operating member; means on or associated with the material to serve as an aligning medium or guide; and means responsive to the magnitude of the lateral deviation of the material from its proper position in its course of travel for imparting a restoring action on the material proportional to the magnitude of said lateral deviation.

2. In a control system for a machine in which a material of web-form is moved toward a working member, the combination with means for shifting the moving material laterally to restore it to proper operative alignment with the working member when the material deviates laterally from its proper normal or neutral course; of means for measuring the magnitude of the lateral deviation, and means for energizing the restoring means in proportion to the measured magnitude of said lateral deviation.

3. In a control system for a machine in which a material of web-form is moved longitudinally toward a working member, in combination with, means for shifting the moving material laterally to restore it to proper operative alignment with the working member when the material deviates from its proper normal or neutral course, means for periodically measuring the magnitude of the deviation within a progressive time interval, and means for progressively energizing the means for shifting or laterally moving the material in accordance with the progressive aggregate of deviations within said progressive time interval.

4. In a control system for a machine in which a material of web-form is moved longitudinally toward a working member, in combination with, material shifting means for shifting the moving material laterally to restore it to proper operative alignment with the working member when the material deviates from its proper normal or neutral course, means for periodically checking the location of the material to determine whether the material has deviated from its course, and means for energizing the material shifting means in proportion to the magnitude of the deviation each time a deviation is detected.

5. In a control system for a machine in which a material of web-form is moved longitudinally toward a working member, in combination with, material shifting means for shifting the moving material laterally to restore it to proper operative alignment with the working member when the material deviates from its proper normal or neutral course, high-speed checking means for frequently periodically checking the location of the material with reference to its proper course to determine whether it has deviated from such proper course and the magnitude of such deviation; and means controlled by the checking means for energizing the material shifting means according to the magnitude of the deviation detected.

6. In a control system for a machine in which a material of web-form is moved longitudinally toward a working member, in combination with, shifting means for shifting the moving material laterally to restore it to proper operative alignment with the working member when the material deviates from its proper normal or neutral course, high-speed checking means for frequently periodically checking the location of the material with reference to its normal course to determine whether it has deviated from such normal course and the magnitude of such deviation, and high-speed means controlled by the checking means to supply an energy impulse to the shifting means each time a deviation is detected by the checking means proportional to the magnitude of the deviation determined each time by the checking means.

7. In a control system for a machine in which a material of web-form is moved longitudinally toward a working member, in combination with, shifting means for shifting the moving material laterally to restore it to proper operative alignment with the working member when the material deviates from its proper normal or neutral course, means for measuring the deviation comprising photo-cell means for detecting both a deviation and the extent of such deviation, and means controlled by the photo-cell means adapted to energize the shifting means.

8. In a control system for a machine in which a material of web-form is moved longitudinally through working members, in combination with shifting means for shifting the moving material laterally to restore it to proper operative alignment with the working member when the material deviates from its proper normal or neutral course, measuring means for measuring the magnitude of the deviation comprising photo-cell means and scanning means between the material and the photo-cell means for periodically checking the location of the material with reference to the normal course to determine the magnitude of the deviation, and means controlled by the deviation-measuring means adapted to energize the shifting means proportional to the magnitude of the deviation.

9. In a control system for a machine in which a material of web-form is moved longitudinally through working members, in combination with, shifting means for shifting the moving material laterally to restore it to proper operative alignment with the working member when the material deviates from its proper normal or neutral course, a source of alternating current to energize the shifting means, a synchronous motor energized from the same source, a photo-cell, a scanning shutter rotated by the synchronous motor to move between the material and the photo-cell to procure high-speed detection of a deviation of the material and the magnitude thereof from a prescribed normal course, and means controlled by the photo-cell for transmitting energy impulses from the source to the shifting means proportional to the magnitude of the deviation.

10. In a control system for a machine in which a material of web-form is moved longitudinally through working members, in combination with, shifting means for shifting the moving material laterally to restore it to proper operative alignment with the working member when the material deviates from its proper normal or neutral course as marked by a predetermined guide line longitudinally located on the web in the direction of travel, an alternating-current circuit to energize the system, a photo-cell on each side of the line and spaced from the material, a source of light, a synchronous motor operated from the circuit and a scanning device rotated by the synchronous motor between the material and each photo-cell to effect a periodic examination of the guide line to check its location, and means, energized by the respective photo-cells, according to a corresponding deviation of the guide line, for transmitting an energy impulse proportional to the deviation from the circuit to the shifting means each time the scanning device detects a deviation of the line from its normal course.

11. In a photo-cell control system, in combination with means for moving a material having a guide line thereon, a pair of photo-cell means disposed at each side of a plane including the guide line, means for establishing relative longitudinal movement between the guide line and the photo-cell means, and means for establishing relative transverse movement between the guide line and the photo-cell means; of means for maintaining a predetermined spaced transverse relationship between the photo-cells and the guide line, and means responsive to a deviation and the magnitude thereof from that predetermined relationship for establishing appropriate relative transverse movement between the photo-cells and the guide line to restore them to the predetermined relationship.

12. A photo-cell control system for maintaining a predetermined alignment between a given line drawn on a base material and a mechanical member to be aligned therewith in an assembly in which a movable device is provided to effect relative lateral movement between the mechanical member and the material bearing the line, said control system comprising a source of light for equally lighting the material on each side of the line when said line is in normal position, a photo-tube for each side of the line, to be energized by the light from its side of the material, a movable scanning disk between each tube and its normal source of light, an amplifying thermionic tube, means connected between the photo-tubes and the amplifying tube to render the amplifying tube conductive when the photo-tubes are unequally energized, a motor for the movable device, two grid-glow tubes connected to the motor and adapted to be connected between the motor and a source of energy to energize the motor in opposite directions, and means controlled by the amplifying tube for controlling the grid circuits of the glow tubes.

13. A photo-cell control system for maintaining a predetermined alignment between a given line drawn on a base material and a mechanical member to be aligned therewith in an assembly in which a movable device is provided to effect relative lateral movement between the mechanical member and the material bearing the line, said control system comprising a source of light for lighting the material on each side of the line in normal position, a photo-tube for each side of the line, to be energized by the light from its side of the material with the line in normal position, a movable scanning disk between each tube and its normal source of reflected light, an amplifying thermionic tube, means connected between the photo-tubes and the amplifying tube to render the amplifying tube conductive when the photo-tubes are unequally energized, a motor for the movable device, two grid-glow tubes connected to the motor and adapted to be connected between the motor and a source of energy to energize the motor in opposite directions, and means controlled by the amplifying tube for controlling the grid circuits of the glow tubes, the scanning disk for each tube having a slot cooperating with the reflected light beam to establish a sweeping effect, whereby the extent of relative deviation of the line from normal position may be detected and the amplifying tube rendered conductive each time such deviation is detected by the periodic operation of the disk, and the glow tubes rendered conductive by the amplifying tube also in accordance with the extent of deviation of the line from relative normal position.

14. A photo-tube control system comprising a motor for establishing a desired normal registration between a mechanical member and a relatively movable material having a guide line for registration and being subject to lateral deviation relative to the mechanical member, said motor having two field windings for respectively establishing motion in each of two opposite directions, an alternating-current source of energy, a grid-glow tube for controlling each field winding from said source, and means for controlling the conductivity of the tubes, said means including two photo-tubes to be placed on opposite sides of the guide line, a source of light for each tube, a scanning disk between each tube and the surface from which light is to be reflected on each side of the normal location of the guide line, the scanning device being synchronized with the alternating-current source for the motor, and means responsive to the photo-tubes upon occurrence of a deviation of the guide line for rendering the glow tubes conductive to transmit correcting energy to the motor in accordance with the extent of deviation.

15. In a control system for a machine in which a material of web-form is moved longitudinally through working members, in combination with, shifting means for shifting the moving material laterally to restore it to proper operative alignment with the working member when the material deviates from its proper normal or neutral course, measuring means for measuring the deviation, said means including a photo-cell, an index on the material, a source of light for projecting a light beam onto the material adjacent the index, and means for reciprocating the beam of light laterally of the index to enable the photo-cell to detect such deviation.

16. In a control system for a machine in which a material of web-form is moved toward a working member, the combination with means for shifting the moving material laterally to restore it to proper operative alignment with the working member when the material deviates from its proper normal or neutral course; of means for measuring the deviation, said means including a photo-cell, an index on the material, a source of light for projecting a light beam onto the material adjacent the index, and means for reciprocating the beam of light laterally of the index path to enable the photo-cell to detect any deviation of the index; a source of alternating current; a discharge rectifier connected thereto, and means controlled by the photo-cell to render the discharge rectifier conductive to transmit a part of the energy impulse of a current wave, according to the extent of deviation.

17. In a registration control system, in combination with a fixed member, a guide line disposed on a material moving longitudinally relatively to the member, a restoral motor for moving the material laterally to correct any movement of the guide line with reference to the member, of means for rotating a beam of light to establish a circle of light symmetrically across the proper registration path of the guide line, means including a single photo-cell for determining the position of the guide line relative to its proper path, and means controlled by the position-determining means for controlling the restoral motor.

18. In a registration control system, in combination with a fixed member, a guide line disposed on a material moving longitudinally relatively to the member, and a restoral motor for moving the material laterally to correct any deviation of the guide line from the registration path, and an alternating current source of energy for the motor, of means for synchronously rotating a beam of light to establish a circle of light symmetrically across the proper registration path of the guide line with the beam timed to cross the path at an instant corresponding to a predetermined point on the voltage wave of the source, and means responsive to each engagement between the light beam and the guide line for controlling the restoral motor according to the location of the guide line relative to its intended proper path.

19. A registration control system comprising a source of alternating current, a source of light, a synchronous motor energized from said source of alternating current and operative to synchronously rotate a beam of light from said light source to establish a circle of light to bear a predetermined relation to a movable line or symbol, means responsive to a variation from that relation, means for moving the line, and means controlled by the variation-responsive means for controlling the line-moving means to reestablish the desired relation.

20. A registration control system comprising a source of alternating current, a source of light, a synchronous motor energized from said source of alternating current and operative to synchronously rotate a beam of light from said light source to establish a circle of light so disposed that a definite point on the circle will bear a fixed relation to a corresponding point on the voltage wave, a positioning index disposed on a movable member to follow a definite path through the light circle, means including means responsive to said light circle for detecting and measuring any deviation of the index from its path, and means controlled by the detecting means for restoring proper correspondence between the index and its path.

21. A registration control system comprising a source of alternating current, a source of light, a synchronous motor energized from said source of alternating current and operative to synchronously rotate a beam of light from said light source to establish a circle of light so disposed that a definite point on the circle will bear a fixed relation to a corresponding point on the voltage wave, a positioning index on a movable member disposed to occupy a predetermined position relative to the light circle, means for detecting and measuring a deviation of the index from its predetermined relation, and means responsive to the deviation detecting means for reestablishing the predetermined relation.

22. A registration control system comprising a source of alternating current, a source of light, a synchronous motor energized from said source of alternating current and operative to synchronously rotate a beam of light from said light source to establish a circle of light so disposed that a definite point on the circle will bear a fixed relation to a corresponding point on the voltage wave, a positioning index on a movable member disposed to occupy a predetermined position relative to the light circle, means for detecting the instant of engagement between the beam and the index to determine whether the movable member and its index has deviated from its intended position, a restoral motor to restore the movable member to proper position, and means controlled by the detecting means to control the energization of the restoral motor.

23. A registration control system comprising a source of alternating current, a source of light, a synchronous motor energized from said source of alternating current and operative to synchronously rotate a beam of light from said light source to establish a circle of light so disposed that a definite point on the circle will bear a fixed relation to a corresponding point on the voltage wave, a positioning index on a movable member disposed to occupy a predetermined position relative to the light circle, means for advancing the movable member in a desired path with the index to serve as a guide, a restoral motor to restore the member to its path from any detected deviation, means for detecting a deviation of the index including a single photocell, means controlled by the cell to set up a deviation timing voltage, means energized from the source of current to set up a standard timing voltage, and means responsive to the chronological sequence of those two timing voltages for controlling the energization of the restoral motor.

24. A registration control system comprising a source of alternating current, a source of light, a synchronous motor energized from said source of alternating current and operative to synchronously rotate a beam of light from said light source to establish a circle of light so disposed that a definite point on the circle will bear a fixed relation to a corresponding point on the voltage wave, a positioning index on a movable member disposed to occupy a predetermined position relative to the light circle, means for advancing the movable member in a desired path with the index to serve as a guide, a restoral motor to restore the member to its path from any detected deviation, means for detecting a deviation of the index including a single photocell, means controlled by the cell to set up a deviation timing voltage, means energized from the source of current to set up a standard timing voltage, two grid discharge tubes for transmitting current waves of respective polarities from the current source to the restoral motor, phase-shifting means for controlling said tubes, and means responsive to the chronological sequence of the two timing voltages for controlling the phase-shifting means.

25. In a system of control for a machine in which a material of web-form is moved longitudinally from one element of the machine to another element and in which machine the material may, contrary to a desired movement, shift transversely to thus get out of alignment with the elements of the machine, in combination, means for transversely shifting the material, and means responsive to the magnitude of the deviation of the material from a desired path of travel adapted to initiate the operation and to control the speed of the means for transversely shifting the material in proportion to the magnitude of the material deviation.

26. In a system of control for a machine in which a material of web-form is moved longitudinally from one element of the machine to another element and in which machine the material may, contrary to a desired movement, shift transversely to thus get out of alignment with the elements of the machine, in combination, shifting means for the material to transversely shift it so that proper alignment of the material to the machine elements may be maintained, a motor for operating the shifting means, and means coacting with said material adapted to energize the motor in direct proportion to the magnitude of the deviation of the material from a desired path so that the instantaneous speed of the motor is a measure of the deviation.

FINN H. GULLIKSEN.